Figure 1:
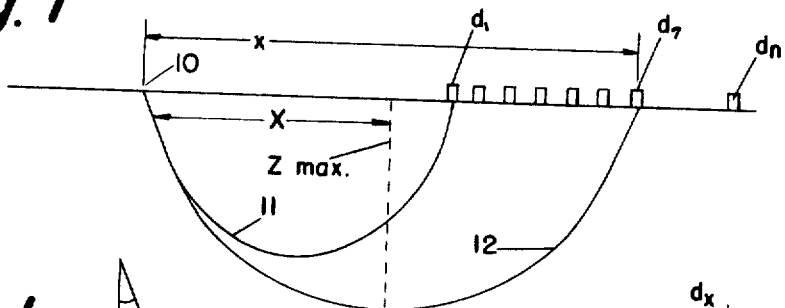

Nov. 8, 1966 R. H. BRATTON ETAL 3,284,765
APPARATUS FOR ESTABLISHING A COMMON DATUM PLANE
Filed Sept. 3, 1963 4 Sheets-Sheet 1

Nov. 8, 1966  R. H. BRATTON ETAL  3,284,765
APPARATUS FOR ESTABLISHING A COMMON DATUM PLANE
Filed Sept. 3, 1963  4 Sheets-Sheet 2

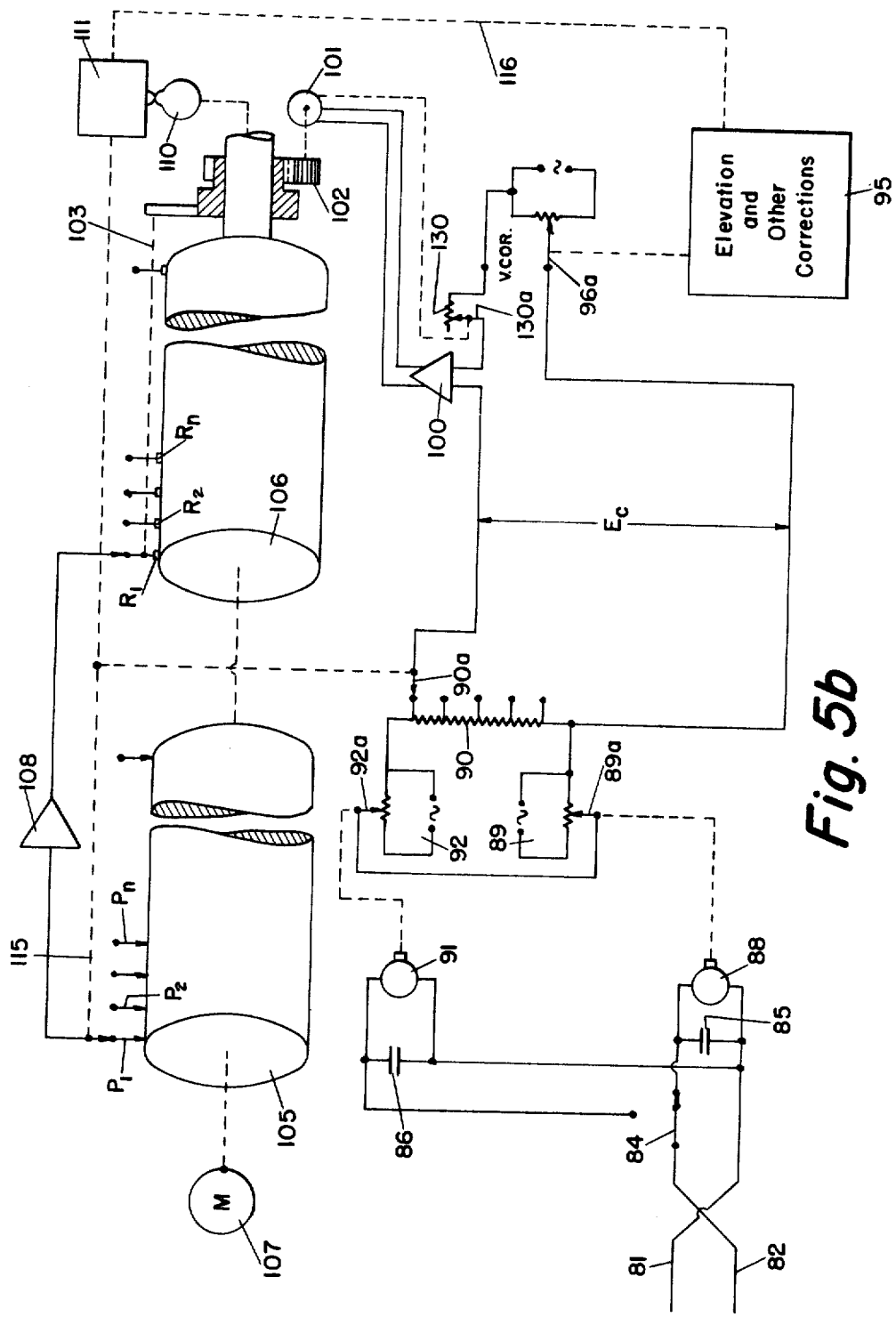

United States Patent Office 3,284,765
Patented Nov. 8, 1966

3,284,765
APPARATUS FOR ESTABLISHING A COMMON DATUM PLANE
Robert H. Bratton and Albert W. Musgrave, Dallas, Tex., assignors to Mobil Oil Corporation, a corporation of New York
Filed Sept. 3, 1963, Ser. No. 306,163
4 Claims. (Cl. 340—15.5)

This invention relates to systems for correcting seismic data for the purpose of providing reliable seismograms from which information may be obtained as to the nature and character of sub-surface formations.

In carrying out seismic surveys by the reflection method, a plurality of detectors are spaced one from another along a line of survey with shot points selected at suitable distances one from the other and in reference to the spread of detectors. The term "shot point" will hereinafter be used to refer to the location of any suitable means of generating seismic energy, such, for example, as the so-called thumping method, dropping of weights, or explosion of dynamite and the like. Upon generation of seismic waves, they travel downwardly into the earth through a near surface layer. In that layer they travel with a velocity lower than that encountered in the deeper consolidated layers which are of greatest interest to the seismologist. Accordingly, it is desirable, if not necessary, to any seismic survey to establish a datum plane in reference to which the data may be corrected to take into account the weathered layer and effectively to remove its effect on the seismic information. Though there are many methods of correcting the data known to those skilled in the art, they leave much to be desired, particularly in the requirement of additional operations in the field in order to obtain reliable information for the correction of the data.

It has also been proposed to make such corrections by utilizing first arrivals, that is, the first signals to which each detector responds following the generation of the seismic energy. Such a method has heretofore entailed long and detailed computations, the plotting of curves, and the transfer of the corrections to the several traces.

In accordance with the present invention, advantage is taken of the fact that the distance $x$ from shot point to each detector is known together with the time of arrival of the first energy at the respective detectors. With this data known, the information represented by it is transformed into vertical travel time. There is also automatically computed the vertical travel time to a selected depth at which, for example, the datum plane is to be established for the correction of all data. Output information from the system performing the computations is then combined with additional corrections, such as for elevation and other variables. The seismic data is then on a trace by trace basis corrected for the weathered layer together with elevation and the like to bring all traces to a common reference, the datum plane.

Figure 1A:
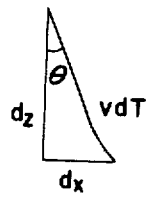
Figure 1B:
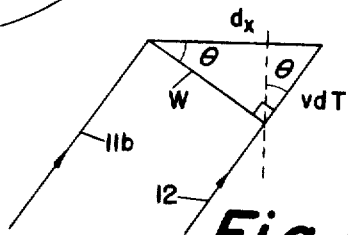
Figure 2:
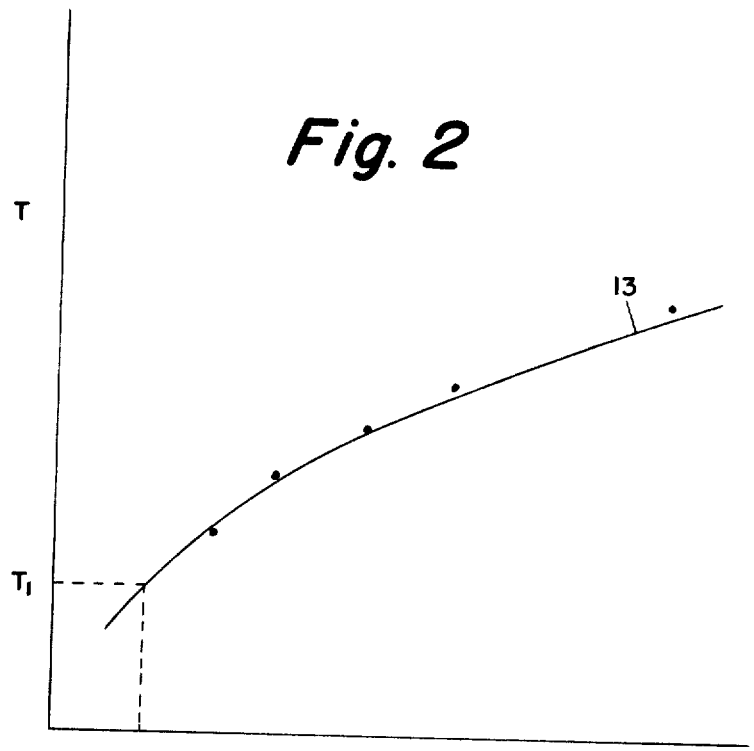
Figure 2A:
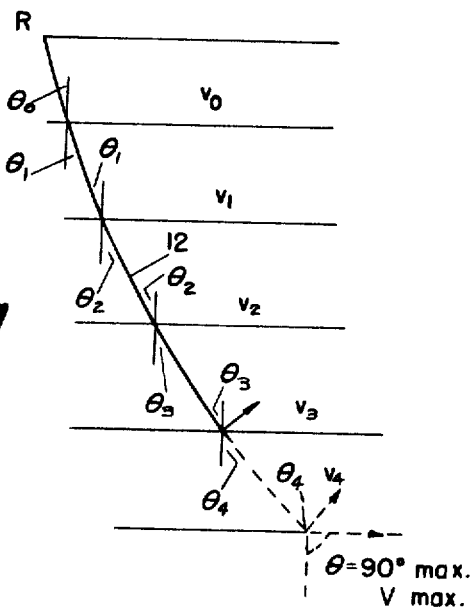
Figure 3:
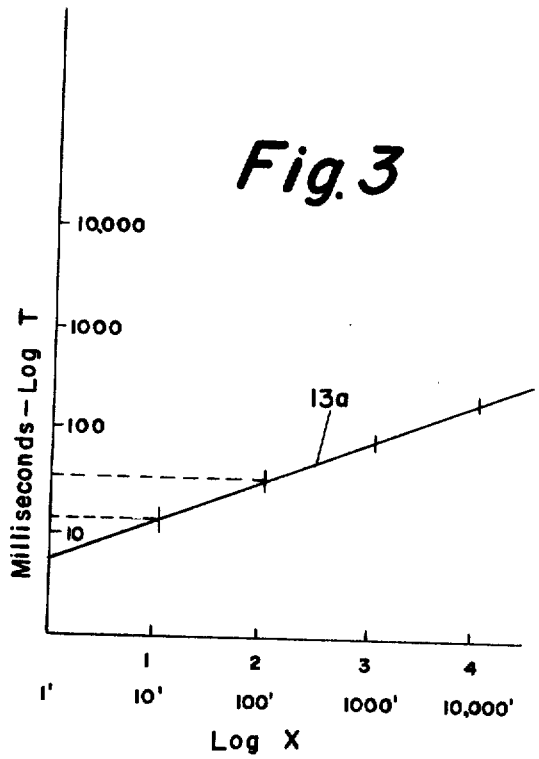
Figure 4:
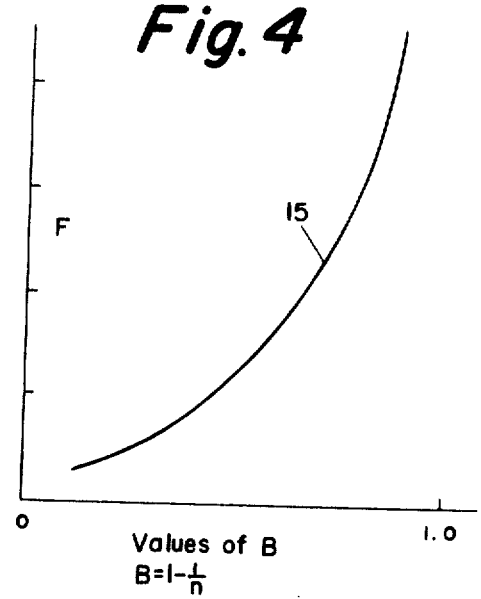
Figure 5A:
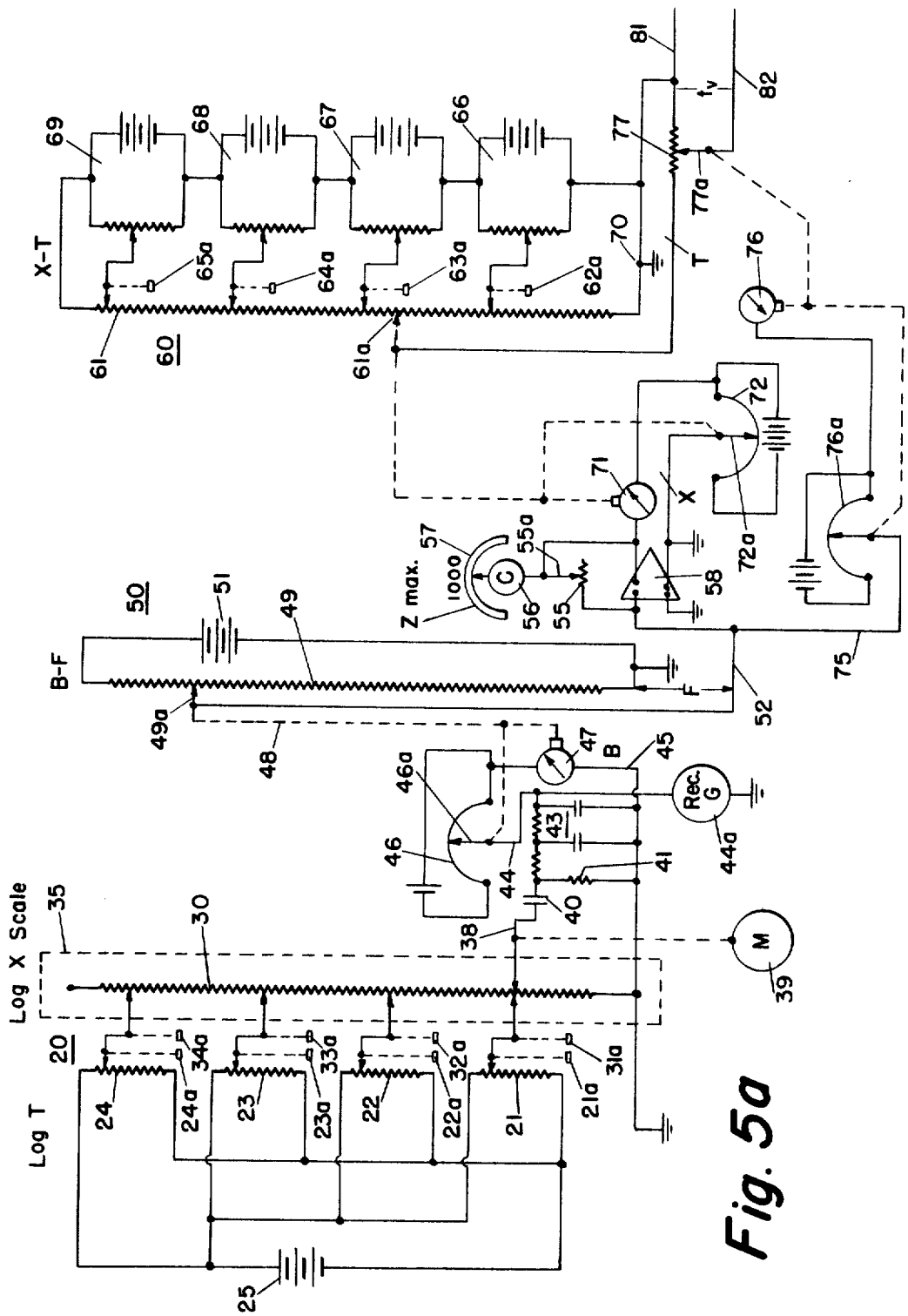

For further objects and advantages of the invention and for alternative ways of practicing the methods and for systems adapted for the realization of the objectives, reference is to be had to the following detailed description taken in conjunction with the accompanying drawings in which:

FIG. 1 shows a geophone spread;
FIG. 1a shows an incremental portion of the refraction wave path;
FIG. 1b shows a portion of the refraction wave path;
FIG. 2 is a plot of travel time vs. horizontal distance;
FIG. 2a shows successive increments of the refraction wave path;
FIG. 3 is a plot of the log of travel time vs. the log of horizontal distance;
FIG. 4 is a plot of gamma functions for corresponding values of B; and
FIGS. 5a and 5b show an analog system which is suitable for carrying out the invention.

Referring now to FIG. 1, there has been illustrated along a section of the earth's surface the location of a shot point 10 from which seismic energy will be generated for travel along ray paths, two of which, the ray paths 11 and 12, have been illustrated. It will be understood that as energy, traversing the paths 11 and 12, arrives at detectors $d_1$ and $d_7$ respectively, responses from the detectors will give rise on the seismogram to wavelets, generally called first arrivals. These are generally referred to as refraction waves due to refracted energy in contrast with energy which may be reflected from reflecting beds. It is to be understood that there will be a first arrival for each of the detectors which may be present in large number, for example 24, though only 8 have been illustrated, the detector $d_n$ representing the last detector of the string. From each trace of the seismogram the time from the shot instant, i.e., the time of release of the seismic energy, to the time of response of its detector may be read and these times may be conveniently tabulated. For convenience in description, this data has been illustrated by a graph 13, FIG. 2, where distance $x$ from shot point (the origin) to detector has been plotted as abscissae and total time of travel T from shot point to detector has been plotted as ordinates. It will be noted that each of the points lies close to the graph 13, though not necessarily precisely upon it. In the following discussion, the data represented by the points plotted in FIG. 2 will be utilized and not values taken from the graph 13.

It will be helpful in understanding the manner in which vertical travel time to different depths below the surface of the ground may be computed from the data obtained from the spread of FIG. 1 to develop necessary mathematical relationships and equations which are then solved to provide the vertical travel times, $t_v$, needed for correction of the seismic data.

Remembering that the ordinates, T, of FIG. 2 represent the travel times of seismic energy from shot point to each detector, and assuming that the vertical velocity of propagation is a continuous increasing function of depth, the following expression may be utilized:

(1) $$v = Cz^{1/n}$$

where:

$C$ = a constant of proportionality for constant values of $n$;
$z$ = depth;
$v$ = average vertical velocity; and
$n$ = a number between 1 and infinity.

From Snell's law, the ratio of the sine of the angle of incidence, $\theta_i$, to the sine of the angle of refraction, $\theta_r$, is defined as follows:

(1a) $$(\sin \theta_i / \sin \theta_r) = v_i / v_r$$

where:

$v_i$ is the velocity in the layer immediately above a refracting bed; and
$v_r$ is the velocity of the seismic waves in the refracting bed.

In FIG. 2a there has been illustrated, somewhat enlarged, a part of the ray path 12 of FIG. 1 and, for convenience in analysis, there has been shown a plurality of closely spaced beds or horizons of increasing velocity. These have been shown to illustrate the application of Snell's law and also to illustrate the premise above-stated; namely, that the average interval velocity in each successive layer increases. Thus, $v_4$ is greater than $v_3$ which is greater than $v_2$, etc. Vertical lines have been drawn crossing each intercept with a bedding interface. The angles of incidence $\theta_0$ to $\theta_4$ have been illustrated.

Applying Snell's law as stated above to FIG. 2a, the following equation may be written:

$$\frac{\sin \theta_0}{v_0} = \frac{\sin \theta_1}{v_1} = \frac{\sin \theta_2}{v_2} = \frac{\sin \theta_3}{v_3} = \frac{\sin \theta_4}{v_4} = \frac{1}{v_{\max}}$$

An inspection of FIG. 2a reveals the angles $\theta_0$ to $\theta_4$ are increasing, and accordingly the angle of penetration or, more specifically, the angle of refraction is increasing. Thus, for the lowermost refracting layer it will be noticed that the angle of refraction is 90°. This means that no additional seismic energy will penetrate below the lowermost bed. It will travel in a horizontal path as indicated by the arrow. To satisfy Snell's law, it will be observed that as the numerator increases, so does the denominator. Hence, when $\theta$ is equal to 90°, $\sin \theta$ is unity, the velocity is then maximum.

From the foregoing, the general equation can be written:

(2) $\qquad \sin \theta_i = v_i / v_{\max}$ where: $v_i$ = average velocity for a given depth Substituting for $v_i$ the expresion in Equation (1), the following may be written:

(3) $\qquad \sin \theta_i = (C z^{1/n}) / v_{\max}$

Substituting for $v_{\max}$ the following equations may be written:

(4) $\qquad \sin \theta_i = \dfrac{C z_i^{1/n}}{C z_{\max}^{1/n}}$ (5) $\qquad \sin \theta_i = \dfrac{z_i^{1/n}}{z_{\max}^{1/n}}$ Rewriting the foregoing equation:

(6) $\qquad z_1 = z_{\max} \sin^n \theta$

Differentiating, (7) $\qquad dz_1 = n z_{\max} \sin^{n-1} \theta \cos \theta d\theta$ From FIG. 1a, it will be seen that: $\tan \theta = dx/dz$ and $dz = dx / \tan \theta$.

Utilizing the last expression in Equation 7 there is obtained:

(8) $\qquad dx = (\sin \theta)/(\cos \theta) n z_{\max} \sin^{n-1} \theta \cos \theta d\theta$ and (9) $\qquad dx = n z_{\max} \sin^n \theta d\theta$ Integrating Equation 9 there is obtained:

(10) $\qquad \int_0^{x/2} dx = n z_{\max} \cdot \int_0^{\pi/2} \sin^n \theta d\theta$ Integrating between the indicated limits, and solving for $x$:

(11) $\qquad x = 2 n z_{\max} \cdot \int_0^{\pi/2} \sin^n \theta d\theta$

If F be defined as:

(12) $\qquad F = 2n \int_0^{\pi/2} \sin^n \theta d\theta$ then (12a) $\qquad z_{\max} = X/F$ There has now been derived the equation of depth vs. distance and one which will be later utilized in the computations.

It is now desired to develop the applicable equation for surface to surface travel time vs. distance and, so far as possible, in the same nomenclature as Equation 1.

Again referring to FIG. 1a, it will be observed that $\cos \theta = dz/vdT$ and that $dz = v \cos \theta dT$.

The following equation was derived above:

(7) $\qquad dz_1 = n z_{\max} \sin^{n-1} \theta \cos \theta d\theta$ or, more generally, $\qquad dz = n z_{\max} \sin^{n-1} \theta \cos \theta d\theta$ Substituting in Equation 7 for $dz_1$ the expression $v \cos \theta dT$, the following equation may be written:

(13) $\qquad dT = \dfrac{n z_{\max} \cdot \sin^{n-1} \theta d\theta}{v}$

Integrating the equation, there is obtained:

(14) $\qquad \int_0^{T/2} dT = \int_0^{\pi/2} \dfrac{n z_{\max} \cdot \sin^{n-1} \theta d\theta}{v}$ where: $T$ = surface to surface travel time It is noted that the differential of time is integrated between the limits of 0 and $T/2$. This represents one-half of the total travel time which from FIG. 1 it will be observed will correspond with the time of travel from the shot point to the point of maximum depth.

It will be remembered:

(2) $\qquad \sin \theta_1 = v_1 / v_{\max}$ where: $v_1$ = average velocity over a given depth.

Substituting the foregoing expression for $v$ in Equation 14, and integrating, the following is obtained:

(15) $\qquad T = \dfrac{2 n z_{\max}}{v_{\max}} \cdot \int_0^{\pi/2} \sin^{n-2} \theta d\theta$ If G now be defined as:

(16) $\qquad G = 2n \int_0^{\pi/2} \sin^{n-2} \theta d\theta$ there may be written:

(17) $\qquad T = (z_{\max} / v_{\max}) G$

However, it will be remembered

(18) $\qquad v_{\max} = C z_{\max}^{1/n}$

Substituting $v_{\max}$ from (18) in Equation 17:

(18a) $\qquad T = \dfrac{z_{\max}}{C z_{\max}^{1/n}} G = \dfrac{G}{C} z_{\max}^{1-1/n}$ Now, making B equal to the exponent $1 - 1/n$, there is obtained:

(19) $\qquad T = \dfrac{G}{C} z_{\max}^{B}$

Since Equation 12a $z_{\max} = X/F$, there may at once be written:

(20) $\qquad T = G/C [X/F]^B$

This is the relationship desired of surface to surface travel time vs. distance. Solving for $x$:

(21) $\qquad X = F[(C/G) T]^{1/B}$

There will now be derived the equation for vertical travel time $t_v$ in terms of the quantities T and F.

First, there will be determined the $x$-component of velocity. This may be expressed by differentiating the preceding Equation 21 to obtain:

(22) $\qquad dx/dT = F/B (C/G)^{1/B} T^{1/B - 1}$

It will be seen from Equation 20 that:

(23) $\qquad C/G = x^B / T F^B$

Substituting the foregoing for $C/G$ in Equation 22, there is obtained:

(24) $\qquad \dfrac{dx}{dT} = \dfrac{F}{B} \left[ \dfrac{x^B}{T F^B} \right]^{1/B} T^{1/B - 1}$ which may be simplified:

(25) $\qquad \dfrac{dx}{dT} = \dfrac{F}{B} \dfrac{x}{T^{1/B} F} T^{1/B - 1} = \dfrac{x}{BT}$ That $dx/dT$ is equal to $v_{\max}$ will now be demonstrated.

Referring to FIG. 1b, an incremental distance $dx$ has been shown horizontally at the earth's surface interconnecting two ray paths 11b and 12. The wave front W is a line drawn from the ray path 11b normal to the ray path 12 and is indicated by the small rectangle as a 90° angle. There has been drawn a vertical line through the intersection of the wave front line W and the ray path 12. The angle of incidence is the angle between a vertical line and the adjacent ray path. It has been labeled as $\theta$. The third side of the triangle can be dimensioned in length, since distance equals velocity multiplied by time. Accordingly, the third side of the triangle can be expressed as $vdT$ since $v$ will be the velocity of the emerging ray 12 and $dT$ the time required for that ray to traverse the indicated third side of the triangle.

It will be seen that two similar triangles have been formed. The two triangles are similar in that both have the common side $vdT$, each a 90° angle, and each a third angle common to the two. Accordingly, the angle between the side $dx$ and W is equal to $\theta$. By inspection,

(26) $$\sin \theta = vdT/dx$$

Rewriting,

(27) $$dT/dx = \sin \theta/v$$

It will be remembered from Snell's law that $$\sin \theta/v = 1/v_{max}$$

Accordingly,

(28) $$dx/dT = v_{max}$$

It will also be remembered that $dx/dT = x/BT$. This establishes that:

(28a) $$dx/dT = vv_{max} = x/BT \text{ or } T = x/Bv_{max}$$

The following derivations establish the linearity of the relationship between log of $x$ and log of T.

It will be remembered, Equation 20, that the surface to surface travel time-distance relationship was as follows:

(29) $$T = G/C(X/F)^B$$

Taking the log of both sides there is obtained:

(30) $$\log T = B(\log x - \log F) + \log G - \log C$$

Simplifying:

(31) $$\log T = B \log x + \log K$$

where:

$$\log K = \log G - \log C - B \log F$$

Since the foregoing equation is of the form $Y = Mx + b$, the values of B (slope) and K may be found by plotting log T vs. log $x$. This is an important part of the concept to be described in connection with the equipment for practicing the invention.

Since time, $t_v$, equals depth, $dz$, divided by velocity, $v$, the expression for vertical time, FIG. 1, where $t_v$ is defined as the time required for travel through the depth $z_{max}$ will be:

(32) $$t_v = \int_0^{z_{max}} \frac{dz}{v}$$

Substituting in the foregoing equation the general form $v = Cz^{1/n}$ (from Equation 1), there is obtained:

(33) $$t_v = \int_0^{z_{max}} \frac{dz}{Cz^{1/n}} = \frac{1}{C}\int_0^{z_{max}} z^{-1/n}dz$$

Integrating $z^{-1/n}dz$, there is obtained:

(34) $$t_v = \frac{1}{CB}z^B{}_{max} = \frac{1}{CB}z^{1-1/n}_{max} = \frac{1}{CB}z_{max}.z^{-1/n}_{max}$$

Since $z^{-1/n} = C/v$ (from Equation 1), then:

(34a) $$t_v = (1/B)(z_{max}/v_{max})$$

Substituting $z_{max} = x/F$ (from Equation 12) there is obtained:

(35) $$t_v = (1/BF)(x/v_{max})$$

Since $T = x/Bv_{max}$ (Equation 28a), then:

(35a) $$t_v = T/F$$

The last equation establishes the sought for relationship of vertical travel time in terms of B, $x$, F and $v_{max}$.

In describing the system of FIGS. 5a and 5b, reference is to be had to FIG. 3 which represents the data of FIG. 2 plotted on log log paper where the log $x$ is plotted as abscissae and the log T is plotted as ordinates. Thus, the curve 13a is a straight line on the log log paper. It is a straight line established by the method of least squares to provide the best possible fit in respect to the observed points appearing in FIG. 3. Inasmuch as the slope of the curve, or line, 13a is equal to B, the system of FIGS. 5a and 5b first determines that slope to provide the solution for B. There is a relationship between B and F which arises since $B = 1 - 1/n$.

Referring to Equation 12 there is given the expression $$F = 2n\int_0^{\pi/2} \sin^n \theta \, d\theta$$

This is a gamma function of recognized form which can be evaluated in terms of all values of $n$. Similarly, B can be evaluated for all values of $n$. Hence, a table may be constructed in relative values of B and F. If the values in such a table be plotted with B as abscissae and values of as ordinates, the graph 15 of FIG. 4 will be obtained.

Referring now to FIGS. 5a and 5b, there is provided a first function generator 20 by means of which there may be established from the data of FIG. 2 the relationship illustrated by the curve 13a of FIG. 3. This function generator 20 includes a multiplicity of networks each including a logarithmic slidewire and having an adjustable tap. To simplify the illustration, only four such networks 21, 22, 23 and 24 have been illustrated, each having the associated adjusting devices or knobs 21a, 22a, 23a and 24a. A battery 25 is connected in parallel across all of the networks. Since the resistance of each slidewire varies logarithmically if the contact associated with slidewire 21 be set by the adjusting device or knob 21a to a value corresponding with $T_1$, the first value of T of FIG. 2, the voltage derived will be proportional to log T. Similarly, the knobs 22a, 23a and 24a and those of other like networks will be set to insert the values of T for each of the observed points of FIG. 2.

By means of a second set of adjusting devices or knobs, 31a–34a, there may be established on a scale 35 the corresponding values of X for each of the foregoing values of T. Thus, with adjusting knob 31a the associated movable contact is set on scale 35 to the value of $X_1$. The scale 35 will be logarithmic and the resistance of resistor 30 will be linear. If, now, a movable contact 38 be operated at constant speed as by a motor 39 to scan the resistor 30, i.e., to be driven from one end to the other thereof, there will be derived a voltage which changes at a rate proportional to the slope of the curve 13a of FIG. 3.

As the contact 38 moves along resistor 30, a varying voltage is produced. An incremental change of voltage, proportional to changes in log T as set by setting devices 21a–24a, is produced for each incremental change in resistance of resistor 30 proportional to log $x$ as set by setting devices 31a–34a. This varying voltage is differentiated as by a capacitor 40 and associated resistor 41. There appears across resistor 41 a voltage proportional to the rate of change of the voltage derived by way of the contact 38.

Inasmuch as observed or measured values of $X_1$ and $T_1$ are utilized in setting up the function generator 20, the voltage produced by the function generator may not vary linearly; in fact, there will be variations corresponding with the interconnection of the observed points by straight lines. Accordingly, the differentiated voltage appearing across resistor 41 is applied to a smoothing circuit 43 shown in the form of a filter including series resistors and shunting capacitors. By thus smoothing the nonlinear variations in the voltage from contact 38, there will be derived between conductors 44 and 45 a voltage closely representative of the slope of the curve 13a. Since the slope is uniform, the curve 13a being linear, the magnitude of that voltage, representative of B, is applied to a measuring circuit including a measuring slidewire 46 with an adjustable contact 46a operable by a detector 47 to a position to introduce into the measuring circuit a voltage equal and opposite to the voltage, the magnitude of which is proportional to B. The voltage B which is applied to the measuring circuit is proportional to the average slope of the line segment defined by the points on the graph 13 (FIG. 2) as set by the setting devices 21a–24a and 31a–34a.

Although the curve 13a of FIG. 3 has been shown as a straight line, it should be pointed out that this is a simplification which will not normally occur in actual practice. Often, the line 13a will have a curve, a "knee" or a "reverse knee." It is necessary that the curve be broken up into a number of line segments, the points of which must nearly fall on a straight line. That is, the four points which are set into setting devices 21a–24a and 31a–34a must very nearly fall on a straight line. When this condition is met, the slope is constant and the voltage produced at conductor 44 is fairly constant with very little fluctuation. In order to determine whether this condition has been met, a recording galvanometer 44a is connected across the filter network to detect fluctuations. When this indicates that the fluctuations in voltage exceed a certain predetermined limit, a new line segment must be fitted to the next plurality of points which most nearly approximates a straight line. These points are set into the setting devices 21a–24a and 31a–34a.

The output of the detector 47, illustrated by dotted line 48 as mechanical, it utilized for the adjustment of a contact 49a relative to a resistor 49 of a second function generator 50 powered by a battery 51. Though the resistor 49 has its resistance varying lengthwise thereof in proportion to the graph 15 in FIG. 4, it is to be understood that function generators of many types may be utilized for the generation of the function illustrated by the graph 15 upon movement of contact 49a from one end of the resistor 49 to the other end thereof. As illustrated, the detector 47 has moved the contact 49a to a position on resistor 49 representative of the then existing value of the slope B of line 13a. Accordingly, having established a position on resistor 49 equal to B, the voltage derived between conductors 52 and ground is equal to the quantity F.

Remembering now that the principal purpose of the present invention is the determination of vertical time to any desired depth and also remembering that a datum or reference plane is to be established, it will be understood that the quantity $z_{max}$ may be established in terms of a setting on a resistor proportional to selected values of $z_{max}$. Thus, a resistor 55 having an adjustable contact 55a may be positioned by a knob 56 to any position along the length thereof and in reference to an associated scale 57 calibrated in terms of $z_{max}$. As illustrated, the pointer of knob 56 identifies the selected value of $z_{max}$ as for instance 1000 feet.

In order to produce the multiplication required by Equation 12a, $X = z_{max}F$, where X is the calculated horizontal distance for a given weathering correction $z_{max}$, the amplifier 58 has been provided. The resistor 55 has been illustrated as part of a feedback resistor associated with an amplifier 58, the input to which is the voltage representative of F. The value of the negative feedback resistor 55 determines the gain of amplifier 58 and introduces a gain therein proportional to the selected value of 1000 feet for $z_{max}$. Accordingly, the output resulting from the multiplication of the voltages representative of F and $z_{max}$ is a voltage proportional to the quantity X which has been defined as the calculated horizontal distance from the shot point to the point where the ray emerges for a value of $z_{max}$ equal to 1000 feet.

Since the quantity X has now been determined and since the relationship between $x$ and T is known, see FIG. 2, a third function generator 60 is provided for the reproduction of a voltage varying in accordance with the graph 13 of FIG. 2. This function generator is generally similar to the generator 20 in that it is provided with a resistor 61 and associated setting devices 62a–65a for deriving selected potentials from associated linear voltage producing networks 66–69. These devices are utilized for setting into the function generator 60, values of T such that for any position of the associated contact 61a there will be derived between that contact and conductor 70 a voltage proportional to T for the corresponding value X as shown in FIG. 2.

The contact 61a is positioned along resistor 61 by means of a detector 71 forming part of a measuring network which includes a slidewire 72 for establishing a balancing voltage against the output of amplifier 58. Thus, the position of the contact 72a will be representative of magnitudes of the value X. Also, the position of the contact 61a relative to the resistor 61 will be representative of magnitude of the value X. Therefore, the voltage on the contact 61a with reference to ground will be proportional to T for the calculated value of X.

Voltages proportional to F and T have now been derived. The voltage representative of F may be applied by way of a conductor 75 to a measuring circuit including detector 76 and adjustable slidewire 76a. This measuring circuit operates in a manner similar to the measuring circuit including detector 47. Detector 76 positions an adjustable contact 77a relative to its associated resistor 77. The resistor 77 is connected between contact 61a and ground and thus there is developed across this resistor a voltage proportional to T. The effect of the detector 76 in positioning contact 77a is to pick off that fractional part of resistor 77 which will develop a voltage equal to T/F. Mathematically, there is thereby obtained a solution of the equation $t_v = T/F$. More particularly, the voltage appearing between conductors 81 and 82 will be proportional to $t_v$.

The quantity $t_v$ is the vertical time for $z_{max}$ which has been determined in the form of an output voltage and it is to be utilized to position recording heads on a recording apparatus to introduce the needed correction, trace by trace, of the seismic data all referred to the selected datum plane of 1000 feet for $z_{max}$.

Though the computed value for $t_v$ may be utilized in different ways for correcting the seismic data on a trace by trace basis, the arrangement shown in FIG. 5b will be illustrative of a preferred way of automatically utilizing the computed values of $t_v$.

Now that there has been explained the manner in which the system of FIG. 5a operates to determine the quantity $t_v$, it is to be understood that the methods of and apparatus for carrying out the invention may be materially modified. For example, the utilization of the distance $x$ from a remotely located source of seismic energy to a selected detector of a spread in conjunction with the arrival time from that source to said detector of said seismic energy may be converted to digital form and used in conjunction with other arrangements for generating for a plurality of distances $x$ a function which varies with the relationship between $\log x$ and $\log T$. By conventional digital program the foregoing function for a particular section of the earth's surface may be differentiated to produce the B-quantity proportional to the expression $(1-1/n)$ which will then be modified for producing the F-quantity proportional to the expression $$2n\int_0^{\pi/2}\sin^n\theta\,d\theta$$

This F-quantity will then be multiplied by a Z-quantity of magnitude proportional to $z_{max}$ to obtain a representation of the distance $x$ through which the seismic energy must travel to reach the $z_{max}$ depth selected for the datum plane. This value of X is then converted by an $x$ vs. T function to establish the time T which is then readily divided by the F-quantity to produce the vertical time $t_v$ to the datum plane at $z_{max}$. It is to be observed from FIG. 1 that this time $t_v$ is at a location at which there is lacking any detector of the illustrated spread which includes detectors $d_1, d_2 \ldots d_n$. The correction $t_v$ is computed as if a detector had been located at the earth's surface at the point where the $z_{max}$ line intersects it. If this had been so, the correction $t_v$ would be applied directly to the trace produced by that detector. Since the spread $d_1, d_2 \ldots d_n$ is located in spaced relationship therewith, there will be utilized proportional parts of $t_v$ to establish the needed corrections for each trace to bring them all to the same datum plane at $z_{max}$. Such a proportioning device may take the form of a linear slidewire calibrated by a distance scale for establishment at one point of a voltage proportional to $z_{max}$ from which there may be selected fractional parts thereof at distances corresponding therewith at which each of the detectors of the spread is located.

Inasmuch as the character of the subsurface structure will not be known, it is preferred to utilize a proportioning device of the kind illustrated in FIG. 5b and which includes a linear resistor 90 though in certain cases, as will be explained, this may be a nonlinear resistor to take care of other variations yet to be explained. In the preferred embodiment of the invention there will be utilized a computation of $z_{max}$ from a different shot point than illustrated in FIG. 1. This new shot point and spread may be, for example, to the right of the shot point and spread shown in FIG. 1. The steps set forth above for the computation of $z_{max}$ will then be carried out with new values of T and X. As a result there will be a computation of a different correction to the selected datum plane $z_{max}$. For convenience, the first described correction will be referred to as $t_{v1}$ and the second as $t_{v2}$.

As illustrated, the output from the voltage divider 77 proportion to $t_{v1}$ is applied by conductors 81 and 82 to capacitor 85 which is charged to a voltage proportional to $t_{v1}$. This voltage is measured by the measuring system including a detector 88 which functions to adjust a contact 89a relative to a potentiometer 89 by an amount proportional to the value $t_{v1}$. As soon as this operation has been completed, the data from the second shot point, as described above, is set into the computer and a single pole double-throw switch 84 is operated to its upper contact to connect the capacitor 86 across conductors 81 and 82 thereby to receive a charge proportional to $t_{v2}$. A measuring system including detector 91 corresponding with the system including detector 88 then functions to adjust contact 92a on potentiometer 92 by an amount proportional to the voltage $t_{v2}$.

The two potentiometers 89 and 92a establish across resistor 90 a voltage which varies linearly with that representative of $t_{v1}$ and that respresentative of $t_{v2}$; i.e., with the contact 90a at any one of the contacts of resistor 90 there will be taken therefrom a voltage proportional to the averaged value of $t_{v1}$ and $t_{v2}$ and of magnitude linearly related to their average. Thus, with the contact 90a in the position illustrated the voltage $E_c$ is at maximum for the maximum correction for the first trace of the seismogram, which seismogram in FIG. 5b has been illustrated as recorded oin magnetic tape supported on a magnetic drum 105 and identified as $P_1$. The correction voltage $E_c$ is applied to an amplifier 100 arranged to control the operation of the motor 101 which determines the magnitude of the voltage $E_c$ and drives an arm 103 to position a recording head $R_1$ by a proportional amount on the recording drum 106 having a magnetic tape, of course, mounted thereon. The motor 101 likewise adjusts a contact 130a of the potentiometer 130 to balance the measuring circuit.

This measuring circuit also includes a potentiometer 97 having a contact 96a adjustable to introduce other desired corrections for the several traces. Though the contact 96a may be adjusted manually in accordance with the observed data, it may be preferred to establish a drive from cam 110 for operation of the correcting wheel 111 automatically to introduce the other corrections into the system by suitable adjustment of contact 96a. With the recording head $R_1$ set to a position established by motor 101, a motor 107 is energized to drive the drums 105 and 106 through a single revolution to re-record the seismogram with the datum plane and other corrections automatically introduced. The stepping switch 115 is then operated to new contacts to interconnect the pickup head $P_2$ and the recording head $R_2$ by way of amplifier 108.

A suitable actuating device as, for example, cam 110 operates a stepping switch as by correcting wheel 111 to move the stepping switch 115 from the pickup head $P_1$ and recording head $R_1$ to the second pickup head $P_2$ and the second recording head $R_2$. At the same time, through the mechanical connection 116, the elevation and other corrections are suitably adjusted and the movable contact 90a is moved to its second position for the insertion of the correct interpolated value of $t_v$ for the correction of the trace from pickup head $P_2$ to be recorded by the recording head $R_2$ now in a position differing from that which was previously occupied by the recording head $R_1$.

Thus it will be seen on a trace by trace basis the $t_v$ and other corrections are automatically introduced for each of the traces on the seismogram. With the above explanation of the preferred mode including the corrections on a trace by trace basis as explained in FIG. 5b, it will be understood by those skilled in the art that certain modifications may be made embodying the principles of the invention as set forth in the claims appended hereto.

The digital computation of the seismic corrections in accordance with this invention may be executed as follows. The description of these digital computations is in general terms which will enable one skilled in the use of digital computers to perform the computations on any commercially available general purpose or scientific computer. More particularly, the computations can be programmed to be performed on the TIAC computer manufactured by Texas Instruments or the 1604 Computer manufactured by Control Data Corporation.

A better understanding of the following description of the digital computations may be obtained from Automatic Data-Processing Systems by Robert H. Gregory and Richard L. Van Horn, published in 1960 by Wadsworth Publishing Company, Inc., San Francisco.

This book contains a general description of the manner in which information is stored in magnetic cores or other storage areas of the computer and called up for the performance of arithmetic operations in the arithmetic unit of a computer. In particular, this book contains, on pages 76–87, a description of an indexing cycle, or loop, which is used to perform on repetitive computations. These loops are used extensively in executing the following program.

In the Blondeau program, an interpretive system, referred to as Fortran, is utilized to convert the original source program to machine language, and storage areas are set aside for groups of variables. One description of a Fortran interpretive system is contained in a publication entitled Fortran System for the 1604 Computer a publication of the Control Data Corp. and bearing Publication No. 087A. Input parameters (times, T; distances, $x$; and depths, $z_{max}$) and control information are stored in the predetermined core areas after they are converted from decimal to binary notation by one of the interpretive built-in routines.

The first operation after data is stored in the computer is to change the times and distances to logarithmic form. This is accomplished by a logarithmic function that is also built into the interpretive system. Each value of $x$ and T is replaced in the core location associated therewith with the corresponding value of log $x$ and log T. One of six available index registers is used to modify the address of the initial $x$ and T for each iteration of the loop and to test the completion of the loop.

The next major portion of the program is to determine how many line segments should be fitted to the parameters $x$ and T. A series of loops are set up to analyze the points. The first loop evaluates slopes between the first point and each succeeding point, and places the slopes in a storage array. The second loop calculates the tangent of the angle (FIRSTD) between the first slope and each succeeding slope and likewise stores these in an array. Upper and lower limits (FIRSTD $\pm$ tan $z°$) are defined by the program and they are used to test the tangents of the angles in a third loop. In this process, if any value falls outside these limits, the program tags the previous points as a line segment and branches back to the first loop to determine new slopes for the remaining points and to progress through the line determination portion until all points have been included on a segment.

The third operation makes further use of loop and index register logic as it applies a least squares curve fit to the points of each line segment. An inner loop is constructed to accumulate the sum of the $x$'s, the T's, the products $xT$, and the distances squared $x^2$ for all the points on a line segment. Upon completion of this iterative process, each summation is divided by the number of points on that line segment. These values are necessary in evaluating the slope and intercept of each line. After the slope and intercept are evaluated, two tests are made to determine whether the data conforms to the Blondeau method. If the slope is greater than 1, control is transferred from this phase of the program to output a message indicating this condition. The second test is performed to compare the equality of the previous slope and the current slope. If they are nearly equal (within $\pm.017$), the program adjusts the index registers and returns to combine all points of the two lines into one line segment.

The fourth phase utilizes the results of the previous set of calculations to solve for the intersections of the line segments. Upon finding the solution for the intersections, it converts these values by a subroutine from the logarithmic notation to a linear scale. These linear values are preserved in storage for the final output loop. The coordinates $(x, T)$ of each intersection must increase. The program tests this condition, and if any point $(x, T)$ is less than the previous $(x, T)$ in storage, once again the index register is adjusted and control is returned to the loop which makes the least squares fit. There the two invalid line segments are combined into one line. If there is only one line segment when the program enters this loop to solve for intersections of the segments, control is immediately transferred to the section to determine the gamma function.

The next loop evaluates a constant (F) to correspond to each line segment. The evaluation employs the slope (B$n$) as follows:

$$Fn = \frac{1}{1-Bn} \cdot \frac{\pi}{2} \cdot \Gamma\left[\frac{1}{\frac{1-Bn}{2}+1}\right] \bigg/ \Gamma\left[\frac{1}{\frac{1-Bn}{2}+1}\right]$$

where $\Gamma$ denotes a gamma function.

The program is written to define a switch which will use the same set of instructions to approximate the gamma function in both the numerator and denominator. The function is approximated by a polynomial expansion which yields accuracy within $\pm.00005$. After the solution is determined for a line segment the result is stored and proper modifications are made to the index register to repeat the iteration for the remainder of the segments.

Finally, the loop which is designed to evaluate the Blondeau calculation is executed. The slopes, intercepts, intersection coordinates, and gamma functions have all been stored for the purpose of this calculation. An iteration through the loop is required for each input depth. After initializing various locations to be used to hold cumulative totals and after setting an index register to identify the line segment, the first two slopes are tested to discover which branch of three should be taken. These branches make calculations for the three Blondeau cases; the "reverse knee," the "normal knee," and the "straight line case." If the "reverse knee" branch is taken, the next step is to set a switch which will return control to the main "reverse knee" branch after the penetration has been summed. Following this, the log function is again used to determine the logarithm of the horizontal distance that corresponds to the penetration. The exponential function, which is contained in the interpretive system, is employed to calculate the linear time at the horizontal distance. This time is necessary to solve for the desired vertical time at the penetration.

If the "normal knee" calculation is taken, a switch is set to establish a linkage between the loop which sums penetrations and the main branch. The same variables are evaluated as were mentioned in the "reverse knee" calculations. However, the formula for their solution differs.

The "straight line" case also has a horizontal distance calculation, a corresponding time calculation and the vertical time calculation. After the program has evaluated data for each line segment to reach the desired depth, it branches to the "straight line" portion and there accumulates a total vertical time for the given depth. Average and interval velocity calculations are then computed. Since all data has been evaluated for the depth, the program branches to a built-in sub-program to output the results. The data is converted from binary to decimal and the output is obtained from an on-line printer in a format specified by the program. After output the index register increments the depth address and the program is returned to the beginning of the Blondeau loop. When data has been computed for all depths, the program exits this loop and halts.

Having described the invention and various modifications thereof, it will be understood that further modifications may now suggest themselves to those skilled in the art and it is intended to cover all those as fall within the scope of the appended claims.

What is claimed is:

1. Apparatus for establishing a common datum plane for the several traces of a seismogram based upon the arrival times T of seismic energy at one or more of a plurality of detectors respectively corresponding in number to said traces, said detectors being spaced at varying horizontal distances $x$ from said source of seismic energy, comprising a first function generator for generating a first electrical signal which varies in accordance with the relationship between log $x$ and log T, a differentiator, said electrical signal being applied to said differentiator to produce a second electric signal representative of the rate of change of the electrical signal applied thereto, a second function generator, said second electrical signal being applied to said second function generator for producing a third electrical signal related to said second electrical signal by $B = 1 - 1/n$ and $$F = 2n \int_0^{\pi/2} \sin^n \theta \, d\theta$$

where B represents said second electrical signal, F represents said third electrical signal and $n$ is a number between 1 and infinity, a multiplier for multiplying said third electrical signal by a fourth electrical signal proportional to the distance selected for location of said datum plane below the earth's surface to obtain a fifth electrical signal proportional to the distance from said source of seismic energy for the travel of said seismic energy to said depth selected for said datum plane, a third function generator for producing a sixth electrical signal proportional to the magnitude of said fifth electrical signal in accordance with the relationship between $x$ and T, and a divider for dividing said sixth electrical signal by said third electrical signal to obtain an output corresponding to the correction to be applied to seismic data to bring said data to said datum plane.

2. Apparatus for establishing a common datum plane below the weathering layer for the several traces of a seismogram based upon the arrival times T of seismic energy at one or more of a plurality of detectors respectively corresponding in number to said traces, said detectors being spaced at varying horizontal distances $x$ from said source of seismic energy, comprising means for generating for a plurality of distances $x$ a first signal which varies with the relationship between log $x$ and log T, a differentiator, said first signal being applied to said differentiator to produce a B-signal proportional to the expression $(1-1/n)$, means for modifying said B-signal for producing an F-signal proportional to the expression $$2n \int_0^{\pi/2} \sin^n \theta \, d\theta$$

a multiplier for multiplying said F-signal by a Z-signal proportional to the distance selected for location of said datum plane below the earth's surface to obtain an X-output signal proportional to the distance $x$ from said source of seismic energy for the travel of said seismic energy to said depth selected for said datum plane, means for generating an $x-T$ signal representative of the relationship between $x$ and T, a comparator for comparing said X-output signal and said $x-T$ signal for establishing a T-output signal of magnitude proportional to said X-output signal as established by said $x-T$ relationship, and a divider for dividing said T-output by said F-signal to obtain an output corresponding to the correction to be applied to seismic data to bring said data to said datum plane.

3. Apparatus for converting seismic refraction information to a weathering correction for a seismic trace obtained from a detector which is responsive to seismic energy generated at a shot point, comprising means for generating a first electrical signal B from said seismic refraction information, said first electrical signal being representative of the slope of the log of seismic wave travel time plotted against the log of horizontal distance between said shot point and said detector, a first converter for converting said first electrical signal B to a second electrical signal F representing the ratio of horizontal distance and vertical depth, means for generating a third electrical signal $z_{max}$ representative of the depth of the weathering correction, a multiplier, said second and third electrical signals to be applied to said multiplier to generate a fourth electrical signal X representative of calculated horizontal distance, a second converter for converting said fourth electrical signal to a fifth electrical signal T representative of total travel time, a divider for dividing said fifth electrical signal by said second electrical signal to produce a sixth electrical signal $t_v$ representative of vertical travel time to the selected weathering correction depth, and means for applying a weathering correction proportional to said sixth electrical signal to said seismic trace.

4. The apparatus recited in claim 3 wherein said first electrical signal is related to said second electrical signal by the expressions $B = 1 - 1/n$ and $$F = 2n \int_0^{\pi/2} \sin^n \theta \, d\theta$$

where B is said first electrical signal, F is said second electrical signal and $n$ is a number between 1 and infinity.

References Cited by the Examiner

UNITED STATES PATENTS 2,800,639  7/1957  Lee _____ 340—15.5

OTHER REFERENCES

Jakosky, Exploration Geophysics, 2nd edition, Trija Publishing Co., California, 1950, pp. 714–724 relied on.

Mota, Determination of Dips and Depths of Geological Layers by the Seismic Refraction Method, Geophysics, vol. 19, No. 2, April 1954, pp. 242–254.

BENJAMIN A. BORCHELT, *Primary Examiner.*

R. M. SKOLNIK, *Assistant Examiner.*